US011107094B2

(12) United States Patent
Utsumi et al.

(10) Patent No.: US 11,107,094 B2
(45) Date of Patent: Aug. 31, 2021

(54) PREDICTION SYSTEM AND PREDICTION METHOD

(71) Applicant: Hitachi, Ltd., Tokyo (JP)

(72) Inventors: Masato Utsumi, Tokyo (JP); Tohru Watanabe, Tokyo (JP); Ikuo Shigemori, Tokyo (JP); Hiroshi Iimura, Tokyo (JP); Hiroaki Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 16/332,054

(22) PCT Filed: Nov. 15, 2017

(86) PCT No.: PCT/JP2017/041168
§ 371 (c)(1),
(2) Date: Mar. 11, 2019

(87) PCT Pub. No.: WO2018/105341
PCT Pub. Date: Jun. 14, 2018

(65) Prior Publication Data
US 2019/0370832 A1    Dec. 5, 2019

(30) Foreign Application Priority Data

Dec. 5, 2016    (JP) .............................. JP2016-236189

(51) Int. Cl.
*G06Q 30/02*    (2012.01)
*G06Q 10/04*    (2012.01)
(Continued)

(52) U.S. Cl.
CPC ......... *G06Q 30/0202* (2013.01); *G06Q 10/04* (2013.01); *G06Q 50/06* (2013.01); *H02J 3/00* (2013.01); *H02J 3/003* (2020.01)

(58) Field of Classification Search
CPC .... G06Q 30/0202; G06Q 10/04; G06Q 50/06; H02J 3/00; H02J 3/003
(Continued)

(56) References Cited

U.S. PATENT DOCUMENTS 5,886,895 A * 3/1999 Kita ....................... G05B 13/00
                                                              700/28
6,032,123 A * 2/2000 Jameson ................ G06Q 10/04
                                                              705/7.22
(Continued)

FOREIGN PATENT DOCUMENTS

CN        104573879 A      4/2015
EP        3 082 096 A1    10/2016
(Continued)

OTHER PUBLICATIONS

Gao Xin,College of Electrical and Information Engineering, Anhui University of Science and Technology, HuaiNan, China, Power Quality Prediction Algorithms and Analysis, 2012 International Conference on System Science and Engineering Jun. 30-Jul. 2, 2012, Dalian, China (Year: 2012).*
(Continued)

*Primary Examiner* — Rutao Wu
*Assistant Examiner* — Abdallah A El-Hage Hassan
(74) *Attorney, Agent, or Firm* — Crowell & Moring LLP

(57) ABSTRACT

Provided is a prediction system for calculating a prediction value related to a prediction target to which prediction in an arbitrary period is adapted. The prediction system includes a storage device which records a plurality of data used to calculate the prediction value and a control device which includes a predetermined operation model and applies the plurality of data to the operation model to calculate the prediction value. The control device changes the operation
(Continued)

model, on the basis of information of respective temporal attributes of the plurality of data.

13 Claims, 8 Drawing Sheets

(51) Int. Cl.
  *G06Q 50/06* (2012.01)
  *H02J 3/00* (2006.01)
  *G06Q 10/00* (2012.01)
(58) Field of Classification Search
  USPC .......................................................... 705/7.31
  See application file for complete search history.

(56) References Cited

U.S. PATENT DOCUMENTS

| | | | | |
|---|---|---|---|---|
| 10,345,770 | B2* | 7/2019 | Noda | G05B 15/02 |
| 2005/0102044 | A1* | 5/2005 | Kohn | G05B 13/024 |
| | | | | 700/28 |
| 2008/0059333 | A1* | 3/2008 | Ganesan | G06Q 10/087 |
| | | | | 705/7.37 |
| 2011/0276527 | A1* | 11/2011 | Pitcher | G06F 30/20 |
| | | | | 706/21 |
| 2012/0010758 | A1* | 1/2012 | Francino | G05B 17/02 |
| | | | | 700/291 |
| 2012/0095608 | A1* | 4/2012 | Murakami | G06Q 30/0202 |
| | | | | 700/291 |
| 2014/0257907 | A1* | 9/2014 | Chen | G06Q 10/04 |
| | | | | 705/7.22 |
| 2016/0033949 | A1* | 2/2016 | Noda | G06Q 10/0631 |
| | | | | 700/291 |
| 2016/0349780 | A1* | 12/2016 | Murai | G05B 13/021 |
| 2017/0017215 | A1* | 1/2017 | Shimizu | G05B 15/02 |
| 2017/0228678 | A1* | 8/2017 | Tange | G06Q 10/06315 |
| 2017/0300819 | A1* | 10/2017 | Hayashi | G06N 20/00 |
| 2018/0128863 | A1 | 5/2018 | Utsumi et al. | |

FOREIGN PATENT DOCUMENTS

| | | | | | |
|---|---|---|---|---|---|
| JP | 2007-199862 | A | | 8/2007 | |
| JP | 2009037796 | A | * | 2/2009 | |
| JP | 2014-180187 | A | | 9/2014 | |
| JP | 2015029292 | A | * | 2/2015 | ........ H04W 72/1284 |
| JP | 2015-90691 | A | | 5/2015 | |
| JP | 2016-220515 | A | | 12/2016 | |
| JP | 2018-92439 | A | | 6/2018 | |
| JP | 2018-92445 | A | | 6/2018 | |
| JP | 2018-163515 | A | | 10/2018 | |
| WO | WO 2016/088370 | A1 | | 6/2016 | |

OTHER PUBLICATIONS

Yoshikazu Fukuyama, Hamid Ghezelayagh, Kwang Y. Lee, Chen-Ching Liu, Yong-Hua Song, and Ying Xiao, Power System Controls. Edited by K. Y. Lee and M. A. El-Sharkawi Copyright #2008 by the Institute of Electrical and Electronics Engineers, Inc. (Year: 2008).*
Dongxiao Niu, Hui Shi School of Business Management University of North China Electric Power Beijing, China Iijian8517@sina. com, Research on Power Load Forecasting Based on Combined Model of Markov and BP Neural Networks, Proceedings of the 8th World Congress on Intelligent Control and Automation, (Year: 2010).*
International Search Report (PCT/ISA/210) issued in PCT Application No. PCT/JP2017/041168 dated Dec. 12, 2017 with English translation (five (5) pages).
Japanese-language Written Opinion (PCT/ISA/237) issued in PCT Application No. PCT/JP2017/041168 dated Dec. 12, 2017 (four (4) pages).
Extended European Search Report issued in European Application No. 17877683.7 dated Apr. 24, 2020 (eight pages).

* cited by examiner

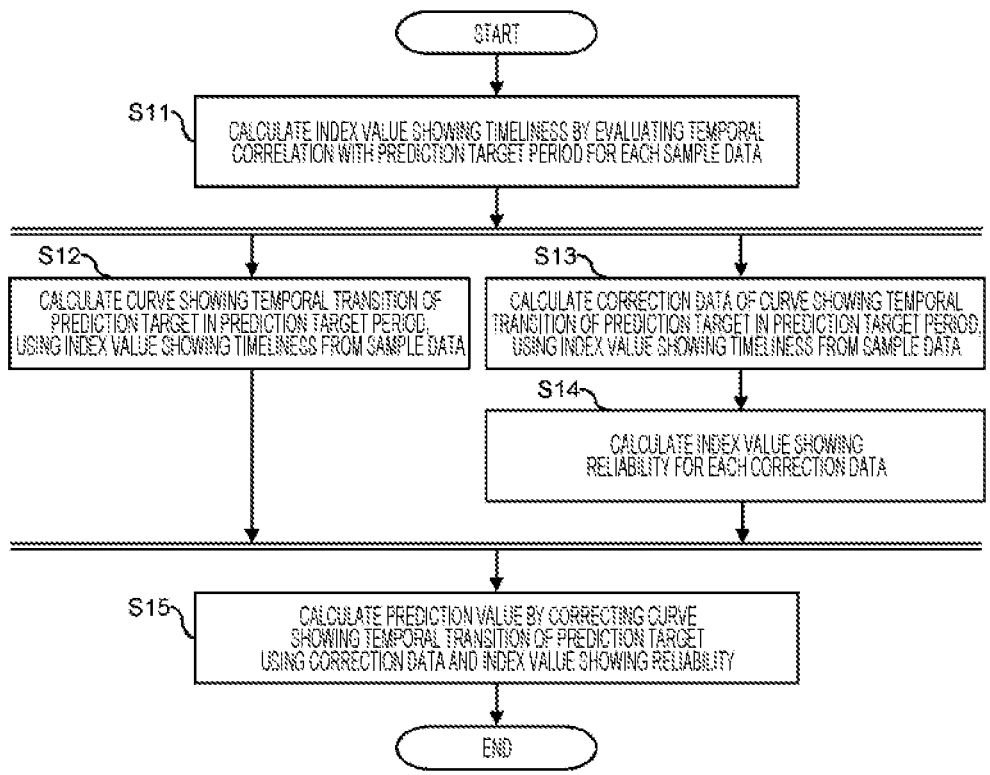
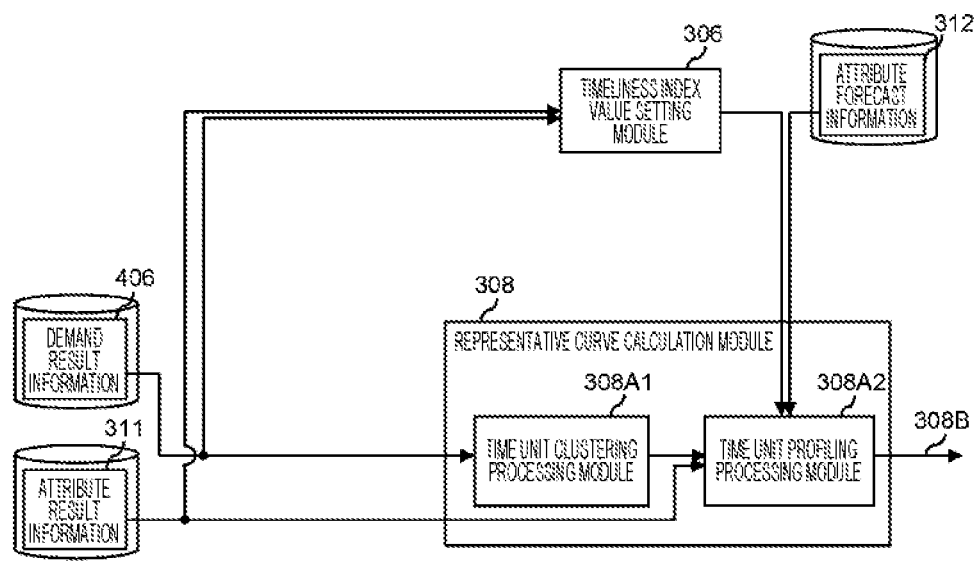

PREDICTION SYSTEM AND PREDICTION METHOD

TECHNICAL FIELD

The present invention relates to a system and method for predicting a predetermined target such as future supply and demand of power, for example, a prediction system and method for predicting a future power demand to be used for managing the power supply and demand.

BACKGROUND ART

Conventionally, this type of system is implemented in a power business field. For example, an electric utility should supply electricity to users, on the basis of an electricity supply contract. The electric utility can create a necessary amount of electricity by power generation autonomously. However, when an amount of electricity is likely to be insufficient, the electric utility previously procures the electricity from other electric utilities and supplies the electricity to the users.

When a procurement amount of power exceeds a sales amount of electricity, this becomes a burden to the electric utility. For this reason, the electric utility adjusts the procurement amount of electricity so that the procurement amount and the sales amount of electricity are matched as much as possible at each settling time. Therefore, it is important to accurately predict a total power demand of all the users.

PTL 1 discloses a demand prediction model for selecting a power demand pattern according to an environmental condition of a day on which a power demand is to be predicted, acquiring a maximum value and a minimum value of a power demand amount at an expected temperature of the prediction day from data of a power demand amount by temperature, and calculating a power demand amount at each unit time of the prediction day using them.

CITATION LIST

Patent Literature

PTL 1: JP 2014-180187 A

SUMMARY OF INVENTION

Technical Problem

Even if the power demand amount is predicted, an error occurs with respect to an actual power demand amount. For this reason, in PTL 1, the power demand pattern according to the environmental condition of the day on which the power demand amount is to be predicted is selected to reduce the error.

However, the invention of PTL 1 is insufficient to eliminate the error of the prediction value of the power demand amount.

Accordingly, an object of the present invention is to provide a prediction system and method capable of further reducing an error of a prediction value than the related art.

Solution to Problem

In order to solve the above problem, in the present invention, there is provided a prediction system for calculating a prediction value related to a prediction target to which prediction in an arbitrary period is adapted. The prediction system includes a storage device which records a plurality of data used to calculate the prediction value and a control device which includes a predetermined operation model and applies the plurality of data to the operation model to calculate the prediction value. The control device changes the operation model, on the basis of information of respective temporal attributes of the plurality of data.

Further, in the present invention, there is provided a prediction method for causing a control device to calculate a prediction value related to a prediction target to which prediction in an arbitrary period is adapted. The control device reads a plurality of data used to calculate the prediction value from a storage device, applies a predetermined operation model to the plurality of data to calculate the prediction value, and changes the operation model, on the basis of information of respective temporal attributes of the plurality of data.

Advantageous Effects of Invention

According to the present invention, it is possible to realize a prediction system and method capable of further reducing an error of a prediction value than the related art.

BRIEF DESCRIPTION OF DRAWINGS

FIG. 3 is a flowchart showing a processing procedure of prediction processing.

FIG. 4 is a block diagram showing a configuration of a prediction system according to a first embodiment of a representative curve calculation module.

DESCRIPTION OF EMBODIMENTS

An embodiment of the present invention will be described in detail below with reference to the drawings.

Figure 1:
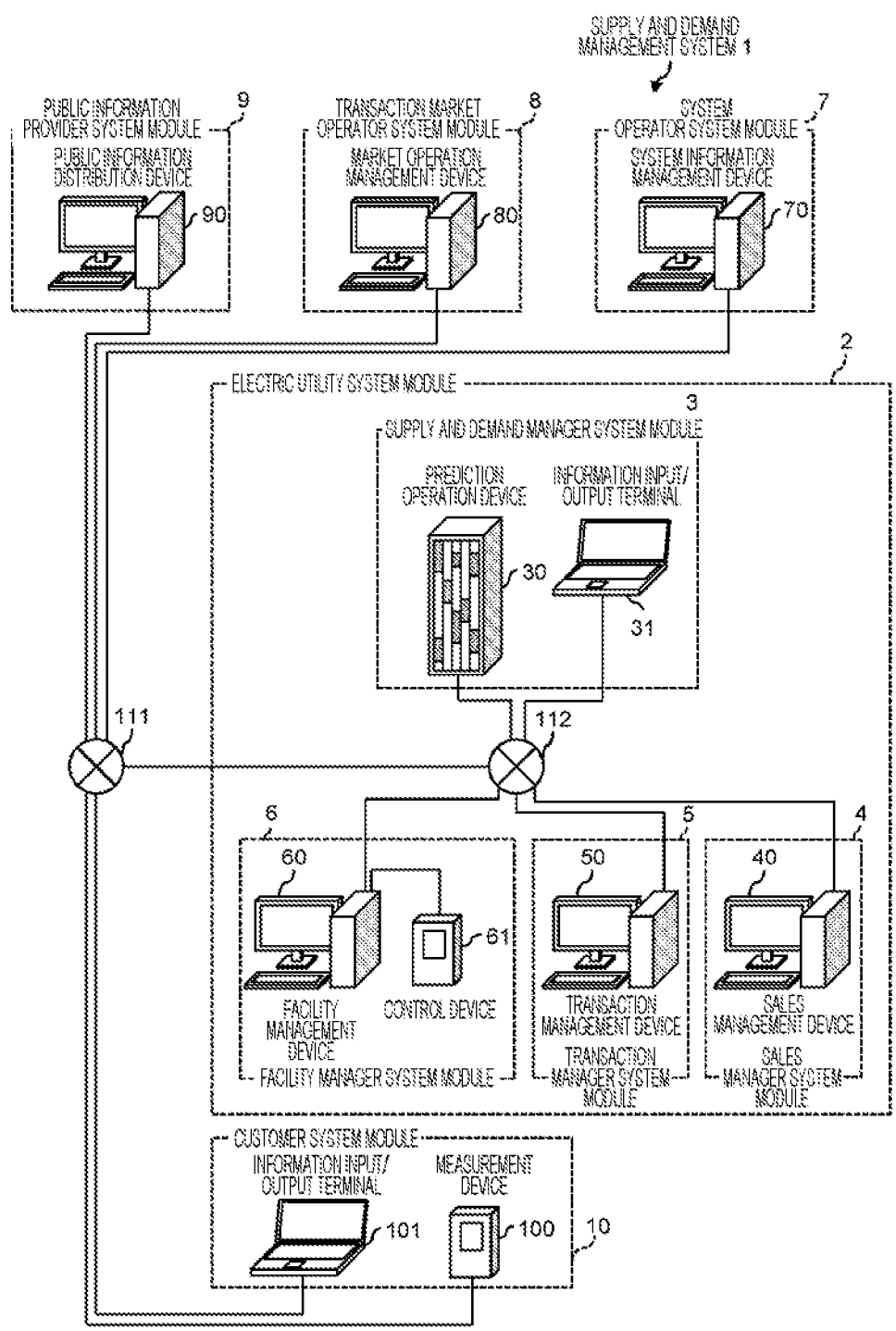
FIG. 1 is a device configuration diagram showing a configuration of a supply and demand management system according to the present embodiment.

(1) Configuration of Supply and Demand Management System According to Present Embodiment FIG. 1 shows a hardware block diagram of a supply and demand management system. A supply and demand management system 1 accurately predicts a value such as a demand amount of power in a future predetermined period, on the basis of a result amount of a power demand in the past, thereby enabling supply and demand management of power such as formulation or adjustment of an operation plan of a generator and formation or adjustment of a procurement transaction plan of power from other electric utilities.

The supply and demand management system 1 includes terminal devices such as a computers mainly, which are owned by a system operator system module 7, a transaction market operator system module 8, a public information provider system module 9, and a customer system module 10, respectively, and a network (111 and 112) such as a LAN that connects these devices to each other so as to enable mutual communication. An electric utility system module 2 includes a supply and demand manager system module 3, a sales manager system module 4, a transaction manager system module 5, and a facility manager system module 6.

The supply and demand manager system module 3 is a system used by a department or a person responsible for predicting a demand amount in a future predetermined period in an operation time unit of a unit of 30 minutes, for example, on the basis of a sales plan possessed by the supply and demand manager or a future sales plan, and managing a procurement amount of power so that the predicted demand amount can be satisfied, and includes a prediction operation device 30 that calculates a prediction value of a demand and an information input/output terminal 31 that exchanges data with the device.

The sales manager system module 4 is used by a department or a person responsible for performing formulation of a sales plan of electricity in a long period or a short period or new contract conclusion of electricity supply and management of an existing electricity supply contract with respect to a customer, and includes a sales management device 40 that manages information of the formulated sales plan and the customer who has concluded the electricity supply contract.

The transaction manager system module 5 is a system used by a department or a person responsible for planning and executing a transaction to procure electricity through a direct contract with other electric utility or an exchange, and includes a transaction management device 50 that manages information of an electricity procurement transaction plan and a concluded electricity procurement contract and exchanges telegrams concerning transactions with other electric utility and the exchange.

The facility manager system module 6 is a system used by a department or a person responsible for formulating and executing an operation plan of a power generation facility owned by an own company or a power generation facility capable of being included in an electricity procurement plan of the own company and not owned by the own company, and includes a facility management device 60 and a control device 61 that receives a control signal from the facility management device 60 and actually executes control of the power generation facility. The facility management device 60 transmits control signals to manage information of the power generation facility, formulate the operation plan of the power generation facility, and execute the operation plan.

On the other hand, the system operator system module 7 is a system used by a business operator who manages transmission and distribution system facilities extending over a wide area and stores a measurement value obtained by measuring a demand result of each customer of the area, and includes a system information management device 70 that distributes the measured result value of the customer.

The transaction market operator system module 8 is a system used by a business operator who integrally manages information and procedures necessary for performing power transactions with respect to a plurality of electric utilities, and includes a market operation management device 80 that distributes information on power transactions and performs collation processing of orders received from the respective electric utilities.

The public information provider system module 9 is a system used by a business operator who provides past observation information on a weather such as a temperature, a humidity, and a solar radiation amount and future forecast information, and includes a public information distribution device 90 that distributes the observation information and the forecast information of the weather.

The customer system module 10 is a system used by an individual or a corporation having a load facility or a power generation facility, and includes an information input/output terminal 101 that transmits information capable of affecting a demand or power generation tendency such as owned facilities, owned installations, industry types, occupants, and locations to the electric utility system module 2 or the system operator system module 7 and a measurement device 100 that measures result amounts of the demand and the power generation.

(2) Prediction Function According to Present Embodiment

Next, a prediction function with which the supply and demand management system 1 according to the present embodiment is equipped will be described. The supply and demand management system 1 is equipped with a prediction function of predicting a power demand amount.

Figure 2:
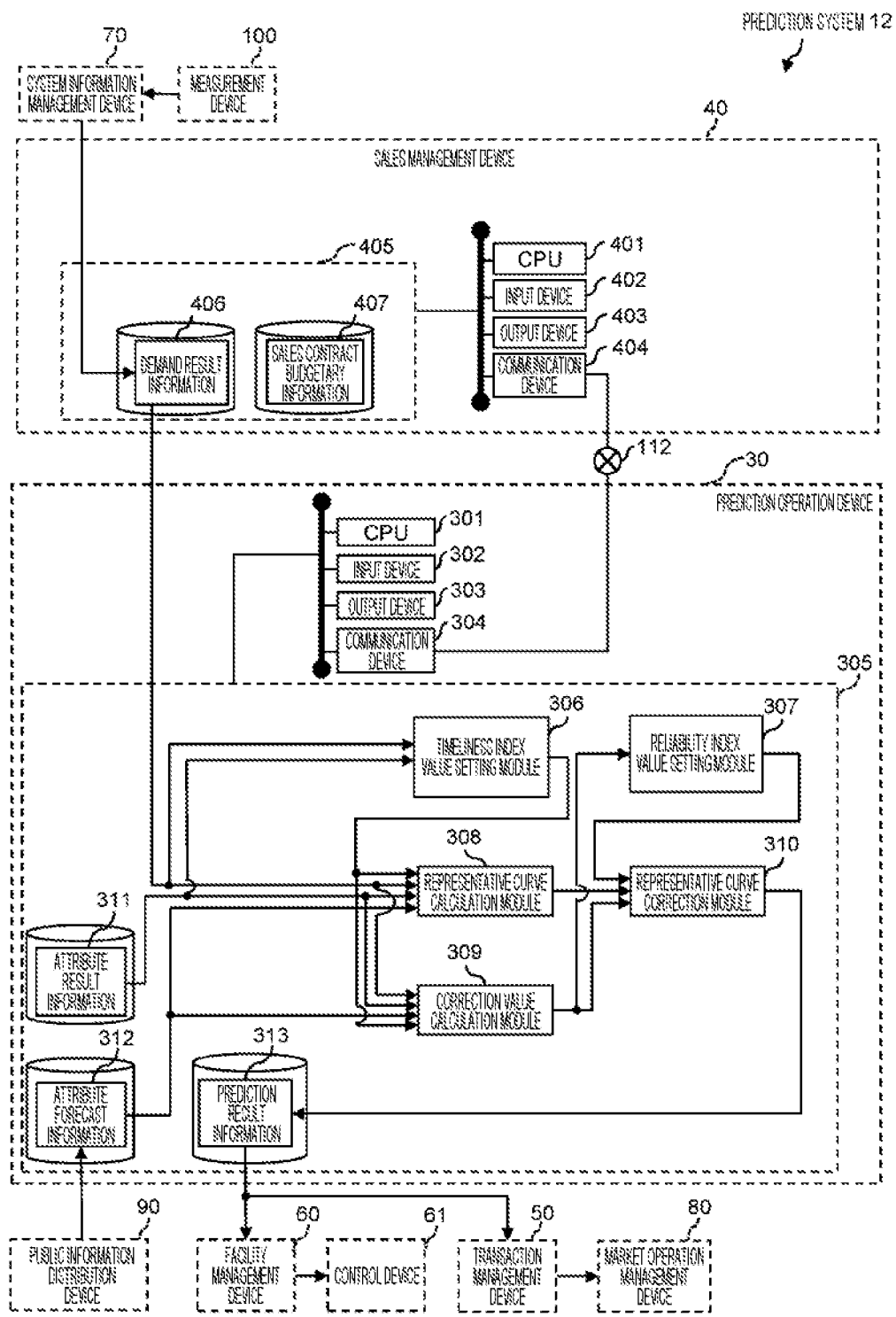
FIG. 2 is a block diagram showing a configuration of a prediction system according to the present embodiment.

FIG. 2 shows a prediction system 12 according to the present embodiment that constitutes a part of the supply and demand management system 1. The prediction system 12 according to the present embodiment is a system for predicting a power demand is equipped with the prediction function, and includes a prediction operation device 30 and a sales management device 40.

The prediction operation device 30 calculates data (hereinafter, referred to as a curve showing a temporal transition) showing a characteristic of a change such as a temporal increase or decrease of a demand value in a preset arbitrary future period, on the basis of attribute result information 311, attribute forecast information 312, and demand result information 406 held by the sales management device 40, corrects the calculated curve to calculate a prediction value, and holds the prediction value in prediction result information 313.

Here, the prediction result information 313 includes at least information of the calculated curve showing the temporal transition of the demand value in the future period and the prediction value calculated by correcting the curve. In addition, the prediction operation device 30 transmits the prediction result information 313 calculated as described above to the facility management device 60 and the transaction management device 50.

The sales management device 40 holds the demand result information 406 and sales contract budgetary information 407. Of these, the demand result information 406 is information including past demand result information 406 of customers who have concluded a contract and customers who are likely to conclude a contract, which is acquired from the measurement device 100 and the system information management device 70. For example, the demand result information 406 includes a result value of a power demand of each customer system module 10 for every 30 minutes for past several years.

Further, the sales contract budgetary information 407 is information created by the sales management device 40 or the sales manager system module 4. For example, the sales contract budgetary information 407 includes information of a supply start date and time, a supply end date and time, and a contract power capacity of each customer system module 10 for which a contract is already concluded or each customer system module 10 for which a contract is scheduled to be concluded, in units of days, weeks, months, or years over past and future arbitrary periods.

The prediction operation device 30 is constituted by an information processing device such as a personal computer, a server computer, and a handheld computer, and includes a central processing unit (CPU) 301 to be a control device to integrally control an operation of the prediction operation device 30, an input device 302, an output device 303, a communication device 304, and a storage device 305.

The input device 302 is constituted by a keyboard, a mouse, or a combination thereof and the output device 303 is constituted by a display, a printer, or a combination thereof. Further, the communication device 304 is configured to include a network interface card (NIC) for connection with a wireless LAN or a wired LAN. Further, the storage device 305 is constituted by storage media of a random access memory (RAM) and a read only memory (ROM).

Various computer programs of a timeliness index value setting module 306, a reliability index value setting module 307, a representative curve calculation module 308, a correction value calculation module 309, and a representative curve correction module 310 are stored in the storage device 305.

The timeliness index value setting module 306 is a program that has a function of evaluating timeliness on whether each sample value (hereinafter, referred to as sample data) to be data used for predicting the attribute result information 311 and the demand result information 406 has a temporal correlation with a future period to be a preset prediction target and calculating an index value showing the timeliness corresponding to each sample data.

The reliability index value setting module 307 is a program that has a function of evaluating reliability such as a variation range of an estimation result for various estimation data calculated in the middle of a processing process in the prediction operation device 30 and calculating an index value showing the reliability corresponding to each of the various estimation data.

The representative curve calculation module 308 is a program that has a function of calculating a curve showing a temporal transition of a prediction target in a future period to be a preset prediction target, using the attribute result information 311, the demand result information 406, the sales contract budgetary information 407, or a combination thereof.

The correction value calculation module 309 is a program that has a function of calculating a correction value (hereinafter, referred to as correction data) to change the amplitude or the frequency of the curve calculated by the representative curve calculation module 308, on the basis of the sample data used for predicting the attribute result information 311 and the demand result information 406 and the index value showing the timeliness calculated by the timeliness index value setting module 306.

The representative curve correction module 310 is a program that has a function of changing the amplitude or the frequency of the curve calculated by the representative curve calculation module 308, on the basis of the index value showing the reliability of each of the correction data calculated by the correction value calculation module 309 and the correction data calculated by the reliability index value setting module 307.

Further, databases of the attribute result information 311, the attribute forecast information 312, and the prediction result information 313 are stored in the storage device 305.

The attribute result information 311 is a database in which past measurement data of attribute information that can explain a shape of the curve showing the temporal transition of the power demand to be the prediction target and an increase and decrease in the scale of the demand is stored.

The attribute result information 311 includes information such as calendar day information, weather information, information showing the occurrence or nonoccurrence of unexpected events of a typhoon and an event, or industry movement information showing actual conditions of various industries capable of affecting the power demand. The calendar day information is day type information showing a year, a month, a day of the week, a weekday, a holiday, or a combination thereof and the weather information shows a temperature, a humidity, a solar radiation amount, daylight hours, an atmospheric pressure, a wind speed, or a combination thereof.

The attribute forecast information 312 is a database in which forecast data in a preset future period for each of the various attribute information stored in the attribute result information 311 is stored.

The prediction result information 313 is a database in which a final prediction result calculated by the prediction operation device 30 or intermediate data in the calculation process is stored. The prediction result information 313 includes information of prediction result data of a prediction target in the preset future period, curve data representing a temporal transition of the prediction target in the same period, correction data to correct the curve, or an operation model (hereinafter, referred to as a model) to be an operation expression used for a calculation operation of these data.

On the other hand, the sales management device 40 is constituted by an information processing device such as a personal computer, a server computer, and a handheld computer, for example, and includes a CPU 401 to integrally control an operation of the sales management device 40, an input device 402, an output device 403, a communication device 404, and a storage device 405.

The input device 402 is constituted by a keyboard, a mouse, or a combination thereof and the output device 403 is constituted by a display or a printer. Further, the communication device 404 is configured to include an NIC for connection with a wireless LAN or a wired LAN.

The storage device 405 is constituted by storage media of a RAM and a ROM and databases of the demand result information 406 and the sales contract budgetary information 407 are stored in the storage device 405.

The demand result information 406 is a database in which information received and acquired from the measurement device 100 and the system information management device 70 is stored and various information including past demand result information of the customer system module 10 for which a contract is already concluded or the customer system module 10 for which a contract is scheduled to be concluded is stored in the demand result information 406. A granularity of the result information is, for example, a unit of 30 minutes and a period is several days to several years.

The sales contract budgetary information 407 is a database in which schedule and result information of a sales plan of electricity created by the sales manager system module 4 is stored, and includes information such as a supply start date and time, a supply end date and time, and a contract power capacity of each customer system module 10 for which a contract is already concluded or each customer system module 10 for which a contract is scheduled to be concluded, in units of days, weeks, months, or years over past and future arbitrary periods.

(3) Prediction Processing

FIG. 3 shows a processing procedure of prediction processing in the prediction system 12. This processing is processing that starts when the prediction operation device 30 receives an input operation from the supply and demand manager system module 3 or at a preset time interval or time, and processing of steps S11 to S15 is executed by the prediction operation device 30.

Actually, the processing is executed on the basis of the various computer programs stored in the storage device 305 and the CPU 301 of the prediction operation device 30. For convenience of explanation, processing subjects are explained as the various computer programs of the prediction operation device 30.

First, the timeliness index value setting module 306 extracts a sample data set to be used for prediction from the demand result information 406 and the attribute result information 311. Then, for each sample data in the sample data set, timeliness to be a degree scale of a temporal correlation with the prediction target period is evaluated and an index value showing the timeliness is calculated (S11).

Here, in the evaluation of the temporal correlation of each sample data in the sample data set and the prediction target period, for example, sample data closer in time to the prediction target period is evaluated as a strong correlation. In addition, the index value showing the timeliness calculated on the basis of the above evaluation is calculated as a function of time. For example, the index value is calculated as the reciprocal of the number of days from the prediction target period or a passage interval. In this case, the larger the index value is, the stronger the correlation with the prediction target period is.

The evaluation of the temporal correlation of each sample data in the sample data set and the prediction target period may be an evaluation based on a time periodic variation tendency of the prediction target. For example, when the prediction target has a seasonal periodic variation tendency, previous year sample data of the same season as the prediction target period is evaluated as strong correlation and the index value showing the timeliness is calculated by using a trigonometric function on a temporal axis.

For example, when the prediction target has a day-of-week periodic variation tendency, sample data of the same day as the prediction target period is evaluated as strong correlation and the index value showing the timeliness is "1" in the case of the sample data of the same day as the prediction target period and "0" in the case of sample data of the other days. This is the same even when the prediction target has a periodic variation tendency based on a day type showing a weekday or a holiday, for example, in addition to the day of the week.

Next, the representative curve calculation module 308 calculates a curve showing a temporal transition of a value of the prediction target, using the demand result information 406, the attribute result information 311, and the attribute forecast information 312 (S12).

In calculating the curve showing the temporal transition of the value of the prediction target, the index value showing the timeliness calculated by the timeliness index value setting module 306 is used. Specifically, after the index value showing the timeliness is multiplied as a weighting coefficient for each sample data, the curve is calculated. As a result, a curve further emphasizing sample data having a strong temporal correlation with the prediction target period is calculated and a curve closer to the shape of the curve predicted to be observed in the prediction target period can be calculated.

On the other hand, the correction value calculation module 309 calculates correction data to correct the curve calculated by the representative curve calculation module 308, using the demand result information 406, the attribute result information 311, and the attribute forecast information 312 (S13).

Here, the correction of the curve specifically means a change in the amplitude to be scale correction on a quantitative axis of the curve or a change in the frequency to be scale correction on a temporal axis of the curve. Therefore, the correction data is a prediction value of a prediction target at an arbitrary time within the prediction target period, a prediction value of a maximum value or a minimum value in an arbitrary period within the prediction target period, or a prediction value of an integration value.

In calculating the correction data, the index value showing the timeliness calculated by the timeliness index value setting module 306 is used. Specifically, after the index value showing the timeliness is multiplied as a weighting coefficient for each sample data, a prediction value of a prediction target at an arbitrary time within the prediction target period, a prediction value of a maximum value or a minimum value in an arbitrary period within the prediction target period, or a prediction value of an integration value to be the correction data is calculated.

As a result, correction data further emphasizing sample data having a strong temporal correlation with the prediction target period can be calculated and can be corrected to a curve to calculate a prediction value closer to the value of the prediction target predicted to be observed in the prediction target period.

Next, the reliability index value setting module 307 evaluates two types of reliabilities, that is, quantitative and temporal reliabilities for each of a prediction value for each of a prediction target at an arbitrary time within the prediction target period, a prediction value of a maximum value or a minimum value in an arbitrary period within the prediction target period, and a prediction value of an integration value to be the calculated correction data, and calculates index values showing the reliabilities (S14). The index value showing the reliability is, for example, a reliable section or a prediction section of each correction data.

Finally, the representative curve correction module 310 changes the amplitude or the frequency of the curve or both the amplitude and the frequency using the correction data of the curve showing the temporal transition of the prediction target in the prediction target period, calculated by the representative curve calculation module 308, and the curve calculated by the correction value calculation module 309 and stores a correction result as a prediction value in the prediction result information 313 (S15).

When the correction is performed, the index value showing the reliability for each correction data, calculated by the reliability index value setting module 307, is used. Specifically, the index value showing the reliability is used as a weighting coefficient at the time of correction, thereby controlling a correction amount of the curve. With the above processing, the prediction processing according to the present embodiment ends.

(4) Details of Each Processing Module (4-1) First embodiment of representative curve calculation module FIG. 4 shows a first embodiment of the representative curve calculation module 308 in the prediction system 12. The representative curve calculation module 308 includes a time unit clustering processing module 308A1 and a time unit profiling processing module 308A2.

The representative curve calculation module 308 according to the present embodiment calculates a curve 308B showing a temporal transition of the prediction target in the future period to be the preset prediction target, using the demand result information 406, the attribute result information 311, and the attribute forecast information 312 to be the demand value data as input samples.

(4-1-1) Time Unit Clustering Processing Module

The time unit clustering module 308A1 classifies the sample data extracted from the demand result information 406, on the basis of a feature amount showing a periodic change of the prediction target.

First, the time unit clustering module 308A1 divides the sample data extracted from the demand result information 406 with a preset time granularity and calculates a new second sample value (hereinafter, referred to as second sample data) set (second sample data set). By using frequency analysis of a Fourier transform or a wavelet transform for each of the divided sample data, a feature amount showing a periodic feature is calculated. Then, clustering processing is performed on the calculated feature amount and sample data having similar waveform shapes in units of 24 hours are, for example, classified as a cluster (hereinafter, referred to as a time cluster).

Known methods may be applied to an algorithm used for the clustering processing using the cluster. As the known methods, k-means to be an unsupervised clustering algorithm of neighboring optimization, an EM algorithm, and spectral clustering are exemplified. Further, as the known methods, unsupervised support vector machine (SVM) to be an unsupervised clustering algorithm of optimization of an identification surface, a VQ algorithm, and self-organizing maps (SOM) are exemplified.

In calculating the feature amount, each sample data is normalized so that an average is 0 and a standard deviation is 1, for example. By applying the normalization, only a periodic feature that does not depend on the magnitude of the value of each sample data is extracted.

(4-1-2) Time Unit Profiling Processing Module

The time unit profiling processing module 308A2 performs specification of commonly existing attributes and calculation of a range of values thereof for each time cluster, calculated by the time unit clustering module 308A1, thereby identifying a discriminator for discriminating each time cluster.

Specifically, using a supervised learning algorithm that uses a sample data set in which identifiers of a number and a name specifying each time cluster are used as teacher labels and each attribute information stored in the attribute result information 311 is used as a predictor, a discriminator in which compatibility with the sample data set becomes highest is identified. Here, an index to measure the compatibility is an index value showing a discrimination degree of the sample data set such as the entropy and the Gini coefficient, a test error at the time of cross validation performed in the process of the discriminator identification, or the like. In addition, the discriminator is one of elements constituting an operation model for calculating the curve showing the temporal transition of the prediction target.

At the time of the above calculation, the index value showing the timeliness for each sample data, calculated by the timeliness index value setting module 306, is used as a weighting coefficient. As a result, a discriminator in which a change with lapse time (hereinafter, referred to as secular change) of a prediction target or the like has been reflected can be calculated. In other words, a structure of the discriminator to be the model for calculating the curve showing the temporal transition of the prediction target can be changed according to the index value showing the timeliness.

By inputting the attribute forecast information 312 to the calculated discriminator, a time cluster where the curve showing the temporal transition of the prediction target in the prediction target period is expected to belong is identified. A method of calculating the curve showing the temporal transition of the prediction target from the identified time cluster is a method of calculating the curve as an arithmetic mean of a sample data group belonging to the identified time cluster, for example. Alternatively, the curve is calculated by a weighted mean with the assignment probability of all time clusters calculated from the discriminator as a weighting coefficient. A processing portion calculated by the curve showing the temporal transition of the prediction target from the identified time cluster is one of the elements constituting an operation model for calculating the curve showing the temporal transition of the prediction target.

Known methods may be applied to a discriminator calculation algorithm. As the known methods, CART, ID3, a random forest decision tree learning algorithm, and a support vector machine (SVM) identification plane learning algorithm are exemplified.

(4-2) Timeliness Index Value Setting Module

For each sample data in the sample data set, the timeliness index value setting module 306 evaluates timeliness to be a degree scale of a temporal correlation of each sample data in the sample data set and the prediction target period and calculates an index value showing the timeliness.

Specifically, the sample data set to be used for prediction is extracted from the demand result information 406 and the attribute result information 311. In addition, for each sample data in the sample data set, timeliness to be a degree scale of a temporal correlation with the prediction target period is evaluated and an index value showing the timeliness is calculated.

Here, in the evaluation of the temporal correlation with the prediction target period, for example, sample data closer in time to the prediction target period is evaluated as a strong correlation. In addition, the index value showing the timeliness calculated on the basis of the above evaluation is calculated as a function of time. For example, the index value may be calculated as the reciprocal of the number of days from the prediction target period or a passage interval. In this case, the larger the index value is, the stronger the correlation with the prediction target period is.

The evaluation of the temporal correlation with the prediction target period may be an evaluation based on a time periodic variation tendency of the prediction target. For example, when the prediction target has a seasonal periodic variation tendency, previous year sample data of the same season as the prediction target period is evaluated as strong correlation and the index value showing the timeliness is calculated by using a trigonometric function on a temporal axis.

For example, when the prediction target has a day-of-week periodic variation tendency, sample data of the same day as the prediction target period is evaluated as strong correlation and the index value showing the timeliness is "1" in the case of the sample data of the same day as the prediction target period and "0" in the case of sample data of the other days. This is the same even when the prediction target has a periodic variation tendency based on a day type showing a weekday or a holiday, for example, in addition to the day of the week.

As described above, the index value showing the timeliness calculated by the timeliness index value setting module 306 is used as a weighting coefficient in the discriminator calculating process in the time unit profiling processing module 308A2. Also, the index value is used for an operation in the correction value calculation module 309. The same effect is obtained in any case and it is possible to execute learning processing further emphasizing the sample data having a strong temporal correlation with the prediction target period. Therefore, data to be calculated becomes more accurate data in which the secular change of the prediction target has been reflected.

(4-3) First Embodiment of Correction Value Calculation Module

Figure 6:
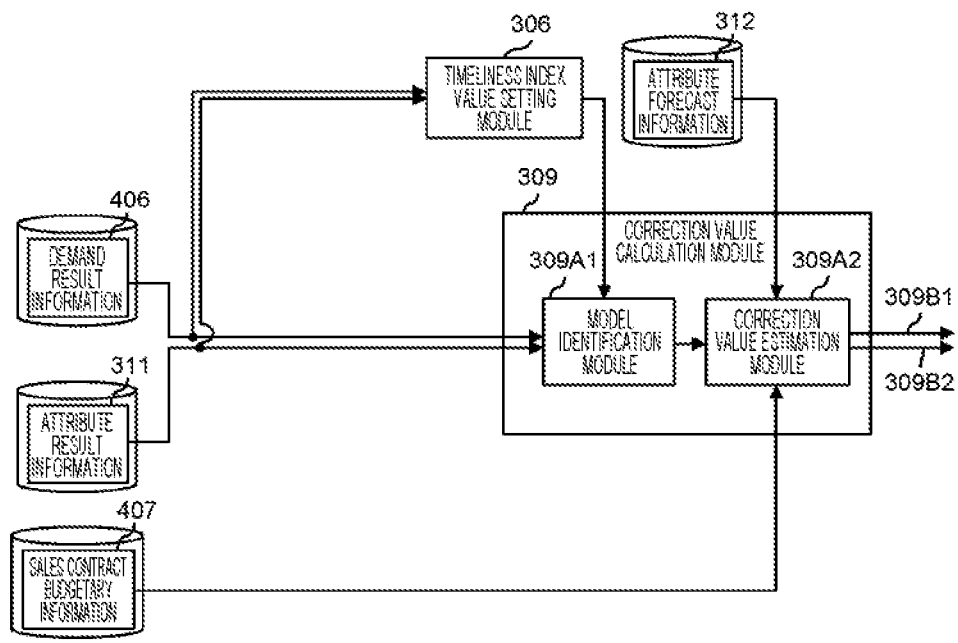
FIG. 6 is a block diagram showing a configuration of a prediction system according to a first embodiment of a correction value calculation module.

FIG. 6 shows a first embodiment of the correction value calculation module 309 in the prediction system 12. The correction value calculation module 309 includes a model identification module 309A1 and a correction value estimation module 309A2.

The correction value calculation module 309 according the present embodiment calculates correction data to correct the curve calculated by the representative curve calculation module 308, using the demand result information 406, the attribute result information 311, and the attribute forecast information 312.

Here, the correction of the curve specifically means a change in the amplitude to be scale correction on a quantitative axis of the curve or a change in the frequency to be scale correction on a temporal axis of the curve. Therefore, the correction data is a prediction value of a prediction target at an arbitrary time within the prediction target period, a prediction value of a maximum value or a minimum value in an arbitrary period within the prediction target period, or a prediction value of an integration value. The prediction value is used as a correction reference point.

(4-3-1) Model Identification Module

First, the model identification module 309A1 identifies a model used for a calculation operation of a prediction value of a prediction target at an arbitrary time within the prediction target period, a prediction value of a maximum value or a minimum value in an arbitrary period within the prediction target period, or a prediction value of an integration value to be the correction data, using the demand result information 406 and the attribute result information 311.

For example, when a prediction value of a prediction target at an arbitrary time within the prediction target period, a prediction value of a maximum value or a minimum value in an arbitrary period within the prediction target period, or a prediction value of an integration value to be the correction data is set to y and an explanatory variable of y is set to x, a relation of the following formula is realized between y and x.

[Formula 1]

$$y = ax_1 + bx_1^2 + cx_2 + dx_2^2 \quad (1)$$

Here, x1 and x2 are, for example, a mean temperature and a result value of y of a previous day, respectively, and specific numerical values are stored in the attribute result information 311. The model identification module identifies an operation model by estimating coefficients a, b, c, and d described in the formula (1) so that compatibility between x and y becomes highest. Specifically, the coefficients are estimated by a least squares method, for example. At that time, an index to measure the compatibility is a residual sum of squares of the identified model and sample data and the compatibility becoming highest means that the residual sum of squares becomes smallest.

In estimating the coefficients, the index value showing the timeliness for each sample data, calculated by the timeliness index value setting module 306, is used. Specifically, the coefficients a, b, c, and d are estimated by a weighted least squares method with an index value showing the timeliness as a weighting coefficient and are calculated as an identification result of a model used for a calculation operation of the correction data. As a result, more accurate correction data in which the secular change of y has been reflected can be calculated.

(4-3-2) Correction Value Estimation Module

In addition, the correction value estimation module 309A2 inputs a forecast value of the explanatory variable x stored in the attribute forecast information 312 to the model used for a calculation operation of the correction data, calculated by the model identification module 309A1, thereby calculating a correction value of the curve showing the temporal transition in the prediction target period as the correction data.

Here, the correction data includes at least two types of information to be information (correction data 309B1) of the correction value itself and information (correction data 309B2) on a time range of each correction value. The information on the time range of each correction value is, for example, in a case where a maximum value or a minimum value in an arbitrary period within the prediction target period is used as the correction data, a range of time at which each value appears.

In addition, the correction value estimation module 309A2 calculates sample error data at the time of calculation by the least squares method as a part of the correction data. The data is data used by the reliability index value setting module 307 at the time of calculating an index value showing the reliability. Further, the data is data of a calculation result of the least squares method executed to identify a model used for a calculation operation of the correction data, calculated by the model identification module 309A1, or a model used for a calculation operation of the correction data by the model identification module 309A1.

When the sales contract budgetary information 407 to be budgetary information of a power sales contract can be used, further accurate prediction can be made. Specifically, the correction data 309B1 calculated by the correction value estimation module 309A2 is once divided by a total contract power capacity at the present time, and an original unit correction value per contract power capacity is calculated.

In addition, the original unit correction value is multiplied by the total contract power capacity in the prediction target period and correction data 309B1 is newly calculated. As a result, more accurate curve correction data can be calculated even when the number of contract customers increases or decreases.

(4-4) First Embodiment of Representative Curve Correction Module

Figure 8:
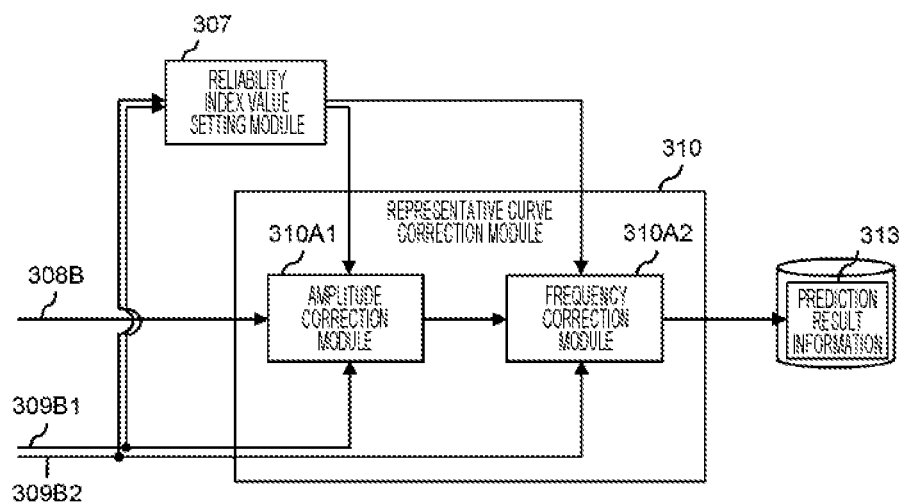
FIG. 8 is a block diagram showing a configuration of a prediction system according to a first embodiment of a representative curve correction module.

FIG. 8 shows a first embodiment of the representative curve correction module 310 in the prediction system 12. The representative curve correction module 310 includes an amplitude correction module 310A1 and a frequency correction module 310A2.

The representative curve correction module 310 according the present embodiment changes the amplitude or the frequency of the curve calculated by the representative curve calculation module 308, using the correction data calculated by the correction value calculation module 309. At this time, the index value showing the reliability of each correction data calculated by the reliability index value setting module 307 is used, so that a more accurate prediction value is calculated.

(4-4-1) Amplitude Correction Module

First, the amplitude correction module 310A1 changes the amplitude of the curve 308B showing the temporal transition of the prediction target in the prediction target period calculated by the representative curve calculation module 308, using the correction data 309B1 calculated by the correction value calculation module 309. Specifically, a corrected curve f^(t) is given by the following formula.

[Formula 2]

$$\hat{f}(t) = \alpha + \beta \times f(t) \quad (2)$$

Here, f(t) is a curve showing the temporal transition of the prediction target in the prediction target period and is a function of time t. In addition, α and β are change coefficients of the curve f(t). That is, the amplitude correction module 310A1 executes processing for estimating the change coefficients α and β so that a residual sum of squares of a prediction value of a prediction target at an arbitrary time within the prediction target period, a prediction value of a maximum value or a minimum value in an arbitrary period within the prediction target period, or a prediction value of an integration value to be the correction data 309B1 and the corrected curve f^(t) is minimized.

When α and β are estimated, the index value showing the reliability for each correction data, calculated by the reliability index value setting module 307, is used. Specifically, after an index value showing quantitative reliability for each correction data is multiplied as a weighting coefficient for the residual of a value of each correction data and the curve f^(t), the change coefficients α and β are estimated.

As a result, the curve f(t) is corrected by preferentially reducing the residual of each correction data calculated by the reliability index value setting module 307 and a value of correction data having higher reliability than correction data having lower reliability, so that final prediction accuracy is improved.

(4-4-2) Frequency Correction Module

In addition, the frequency correction module 310A2 changes the frequency of the curve 308B showing the temporal transition of the prediction target in the prediction target period calculated by the representative curve calculation module 308, using the correction data 309B2 calculated by the correction value calculation module 309.

For example, when the correction data is a prediction value of a maximum value or a minimum value in an arbitrary period within the prediction target period, the frequency of the curve f(t) is changed so that a mean value or a mode value of each appearance time range stored in the correction data 309B2 and corresponding time of the corrected curve f^(t) are matched or a residual sum of squares thereof is minimized. In addition, the corrected curve f^(t) is calculated as a prediction value of the prediction target in the prediction target period and stored in the prediction result information 313.

When the correction is performed, the index value showing the reliability for each correction data, calculated by the reliability index value setting module 307, is used. Specifically, after an index value showing temporal reliability for each correction data is multiplied as a weighting coefficient for the residual of a value of each correction data and the curve f^(t), correction processing is executed. As a result, the curve f(t) is corrected by preferentially reducing the residual of each correction data calculated by the reliability index value setting module 307 and a value of correction data having higher reliability than correction data having lower reliability, so that final prediction accuracy is improved.

(4-4-3) Reliability Index Value Setting Module

The reliability index value setting module 307 evaluates two types of reliabilities, that is, quantitative and temporal reliabilities for each of a prediction value for each of a prediction target at an arbitrary time within the prediction target period, a prediction value of a maximum value or a minimum value in an arbitrary period within the prediction target period, and a prediction value of an integration value to be the calculated correction data, and calculates index values showing the reliabilities.

Specifically, from a model used for a calculation operation of each correction data or sample error data calculated in the model identification process, included in the correction data 309B1 calculated by the correction value estimation module 309A2, a reliable section and a prediction section of the estimation value of each correction data or a variance and a standard deviation of sample errors are calculated. These are calculated as the index values showing the quantitative reliabilities.

From information of an appearance time range of a value of each correction data included in the correction data 309B2 calculated by the correction value estimation module 309A2, a reliable section and a prediction section of each correction data on a temporal axis or a variance and a standard deviation of the information of the time range are calculated. These are calculated as the index values showing the temporal reliabilities.

As described above, the representative curve correction module 310 uses the index value showing the reliability, so that prediction accuracy of a prediction value to be finally calculated can be improved.

The operation plan of the power generation facility operable by the facility management device 60 is calculated on the basis of the prediction result information 313 calculated by the prediction processing described above and is transmitted to the control device 61. The control device 61 that has received the operation plan calculates a specific control value of the power generation facility and executes actual control.

In addition, the transaction management device 50 creates a transaction plan related to trading of power with another electric utility or a transaction market and transmits a telegram of a trading order or order cancellation to the market operation management device 80.

(5) Effects of Present Embodiment

Figure 11:
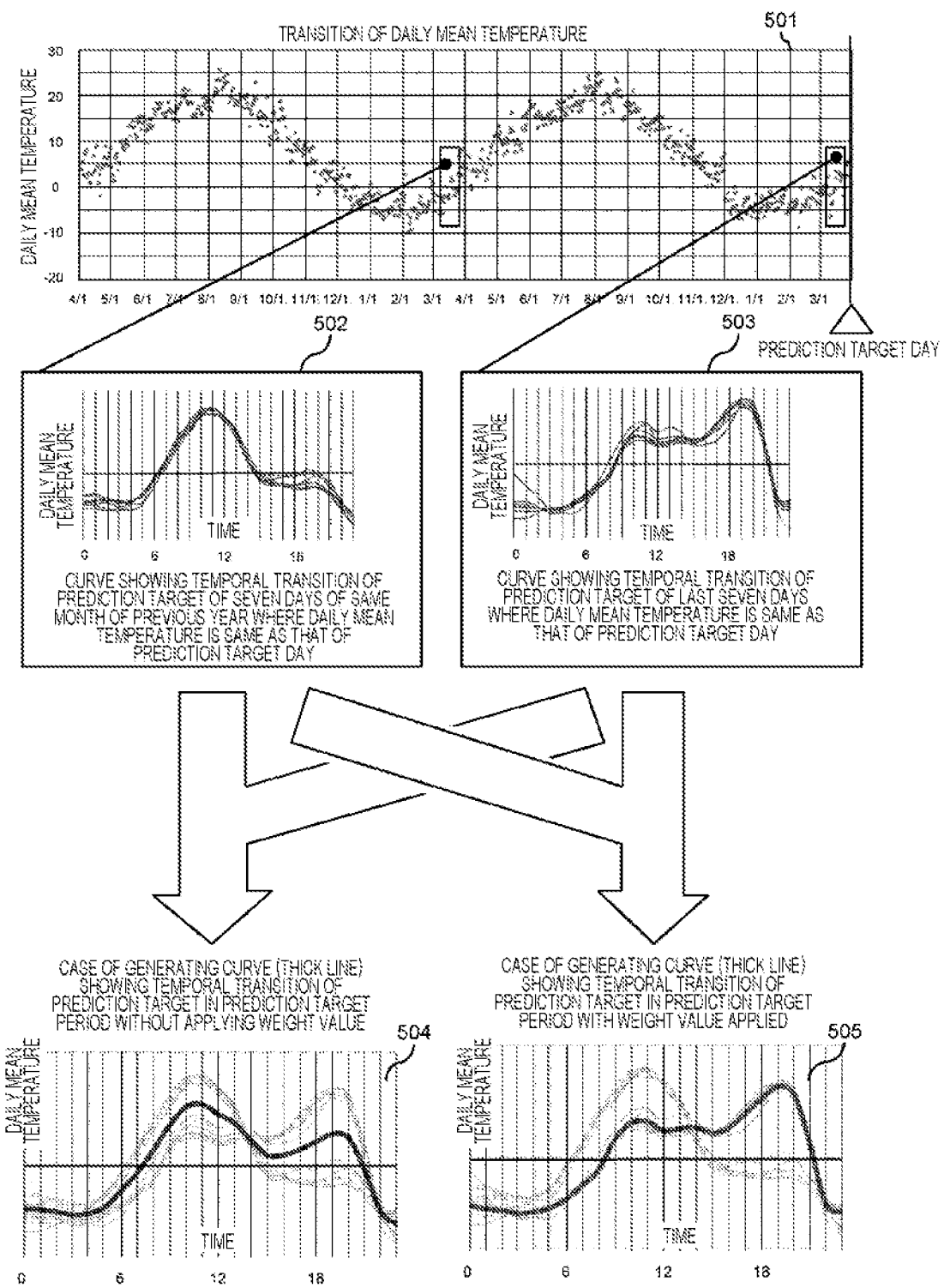
FIG. 11 is a conceptual diagram showing an effect of the present embodiment.

As shown in FIG. 11, a calculation result of the curve showing the temporal transition of the prediction target in the prediction target period, output by the representative curve calculation module 308, is different in the case of using the index value showing the timeliness of each sample data, calculated by the timeliness index value setting module 306 and the case of not using the index value.

First, a graph 501 of FIG. 11 shows a transition of a mean temperature for each day in a year. Here, if a most important attribute is a daily mean temperature in the discriminator of the time cluster calculated by the time unit profiling processing module 308A2 in the representative curve calculation module 308, a time cluster to which sample data of the same mean temperature as the prediction target period belongs is identified as a time cluster to which the curve showing the temporal transition predicted to be observed in the prediction target period belongs.

Specifically, two time clusters shown by graphs 502 and 503 of FIG. 11 are time clusters of candidates to be identified. Here, it is assumed that the curve showing the temporal transition of the prediction target changes from a curve shown by the graph 502 to a curve shown by the graph 503 after one year.

Here, it is assumed that the index value showing the timeliness of each sample data is not used in the calculation process of the above discriminator. In the discriminator calculated in that case, the time clusters of the graph 502 and graph 503 of FIG. 11 are identified as almost the same probabilities. Therefore, the curve showing the temporal transition of the prediction target in the prediction target period is calculated as a mean curve of both the temporal clusters as shown by a graph 504 of FIG. 11 and a secular change of the curve cannot be recognized.

On the other hand, when the index value showing the timeliness of each sample data is used, as shown by a graph 505 of FIG. 11, the curve showing the temporal transition of the prediction target in the prediction target period is calculated as a shape closer to a most recent curve after the secular change. Therefore, final prediction accuracy can be improved.

The index value showing the timeliness of each sample data is also used in the correction value calculation module 309 and its effect and principle are the same as those described above.

Figure 12:
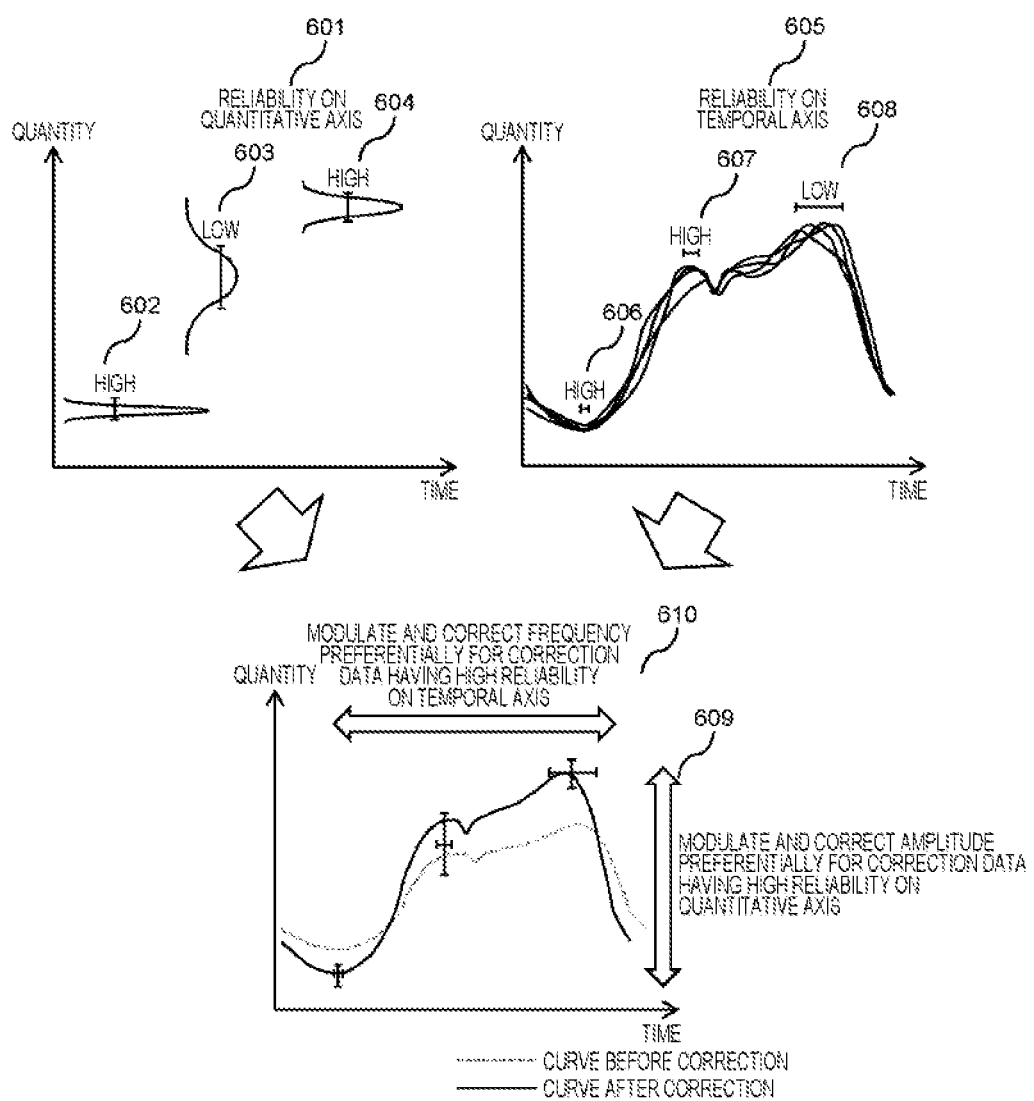
FIG. 12 is a conceptual diagram showing an effect of the present embodiment.

In addition, FIG. 12 shows an influence on the corrected curve to be the final prediction result calculated by the representative curve correction module 310, when the index value showing the reliability for the correction data of the curve, calculated by the reliability index value setting module 307, is used.

As the index value showing the reliability for the correction data of the curve, calculated by the reliability index value setting module 307, there are index values showing at least two types of reliabilities of quantitative reliability and temporal reliability.

First, a graph 601 of FIG. 12 conceptually shows the quantitative reliability. Here, as the correction data of the curve, for example, a minimum value in the early morning, a maximum value around noon, and a maximum value around the evening are used.

At this time, the index values showing the respective reliabilities are defined as variances on a probability density function shown by graphs 602, 603, and 604 of FIG. 12, respectively. To simplify the explanation, the index value is represented by high and low binary values.

Here, the reliabilities of the minimum value in the early morning and the maximum value around the evening are high and the reliability of the maximum value around noon is low. Therefore, as shown by a graph 609 of FIG. 12, the change in the amplitude of the curve performs correction to minimize the residual on the quantitative axis of the curve and the minimum value in the early morning and the residual on the quantitative axis of the curve and the maximum value around the evening, after allowing enlargement of the residual on the quantitative axis of the curve and the maximum value around noon.

On the other hand, a graph 605 of FIG. 12 conceptually shows the temporal reliability. Here, similar to the above case, it is assumed that a minimum value in the early morning, a maximum value around noon, and a maximum value around the evening are used as the correction data of the curve.

At this time, it is assumed that the index values showing the respective reliabilities are defined as ranges of past observation values shown by graphs 606, 607, and 608 of FIG. 12, respectively. To simplify the explanation, the index value is represented by high and low binary values.

Here, the reliabilities of the minimum value in the early morning and the maximum value around noon are high and the reliability of the maximum value around the evening is low. Therefore, as shown by a graph 610 of FIG. 12, the change in the amplitude of the curve performs correction to minimize the residual on the temporal axis of the curve and the minimum value in the early morning and the residual on the temporal axis of the curve and the maximum value around noon, after allowing enlargement of the residual on the temporal axis of the curve and the maximum value around the evening.

As described above, the curve correction in which priority is given to the correction data with the high reliability is performed, so that the corrected curve to be the final prediction value can be made a more plausible curve. In other words, it is possible to obtain a prediction value considering usefulness such as the reliability of each of the sample values in the prediction and the processing data obtained during the processing.

(6) Other Embodiment of Each Module (6-1) Second Embodiment of Representative Curve Calculation Module In the first embodiment of the representative curve calculation module 308 described above, the case where the clustering algorithm using the feature amount showing the feature of the periodic variation of the prediction target is used as the method of calculating the curve showing the temporal transition of the prediction target in the prediction target period has been described. However, the present invention is not limited thereto. For example, the representative curve calculation module 308 may calculate a curve with an arithmetic mean of sample data of the past several days of the same day type as the prediction target date.

Further, in the first embodiment of the representative curve calculation module 308 described above, the case where the data to be the prediction target stored in the demand result information 406 is one data measured by one meter or one data obtained by combining a plurality of data measured by a plurality of meters has been described. However, the present invention is not limited thereto. For example, in the case of power demand data, more accurate prediction may be realized by using the data of the prediction target as measurement data of each meter installed for each customer of power.

Figure 5:
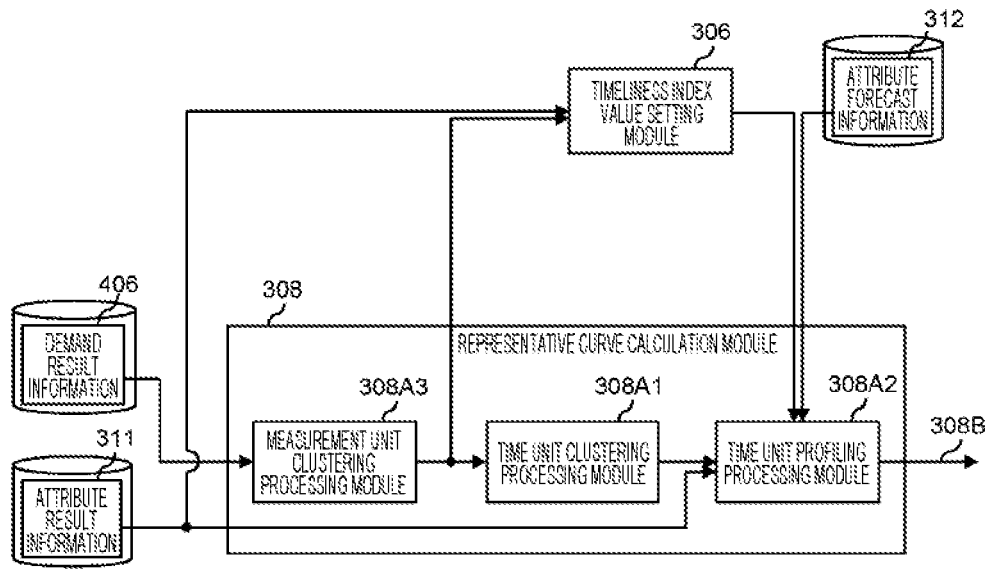
FIG. 5 is a block diagram showing a configuration of a prediction system according to a second embodiment of a representative curve calculation module.

Specifically, as shown in FIG. 5, the representative curve calculation module 308 further includes a measurement unit clustering processing module 308A3. The measurement unit clustering processing module 308A3 extracts data for each meter stored in the demand result information 406 as the same period of past 365 days, for example, and sets meter data for each customer as input sample data.

By performing frequency analysis of a Fourier transform or a wavelet transform on each sample data, a feature amount showing a periodic feature is calculated. In addition, clustering processing is performed on the calculated feature amount and sample data having similar waveform shapes in units of 365 days (8760 hours) are classified as a cluster (hereinafter, referred to as a meter cluster).

Hereinafter, the same time clustering processing and time unit profiling processing as those in the first embodiment of the representative curve calculation module 308 are performed on a representative waveform of each meter cluster. A method of calculating the representative waveform of each meter cluster is, for example, an arithmetic mean of each meter cluster.

As described above, the data is classified in advance for each of the measurement points having similar variations of the value of the prediction target in the long period, so that the sample variance in the sample data can be reduced, and accuracy of the curve showing the temporal transition of the prediction target in the prediction target period to be calculated by the following processing can be improved.

(6-2) Second Embodiment of Correction Value Calculation Module

In the first embodiment of the correction value calculation module 309 described above, the case where the amplitude or the frequency of the curve showing the temporal transition of the prediction target in the prediction target period is corrected so that the curve is matched with a prediction value of the prediction target at an arbitrary time within the prediction target period, a prediction value of a maximum value or a minimum value in an arbitrary period within the prediction target period, or a prediction value of an integration value or a residual sum thereof is minimized has been described. However, the present invention is not limited thereto. For example, the change coefficients α and β shown by the formula (2) may be directly handled as correction data, for example, the change coefficients are handled as the correction data.

Figure 7:
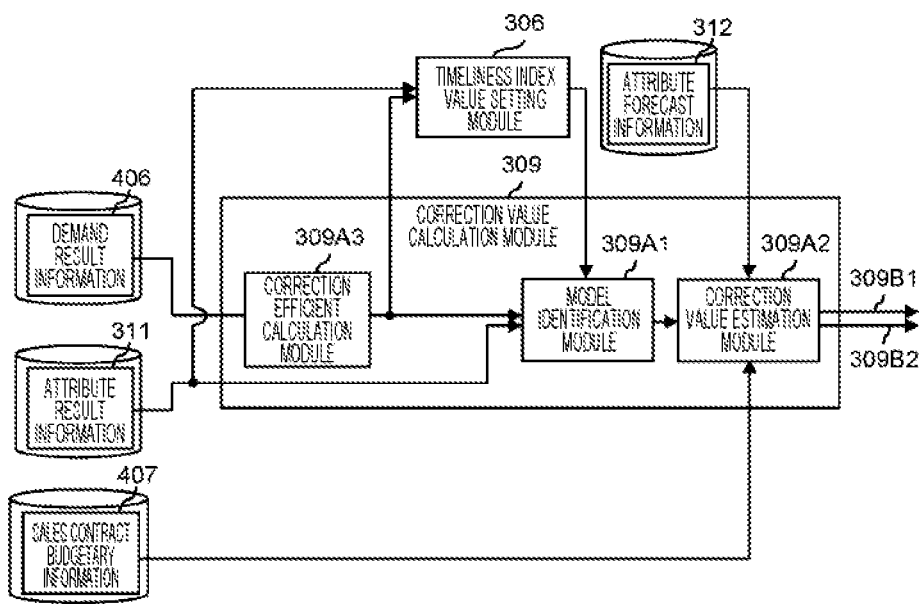
FIG. 7 is a block diagram showing a configuration of a prediction system according to a second embodiment of a correction value calculation module.

The correction value calculation module 309 according to the present embodiment further includes a correction coefficient calculation module 309A3 as shown in FIG. 7 and directly predicts a correction coefficient of the curve. The correction coefficient calculation module 309A3 calculates the sample data of the change coefficients α and β, using the sample data extracted from the demand result information 406.

Next, similar to the processing described using FIG. 6, the model to be used for a calculation operation of the change coefficients α and β is identified by the model identification module 309A1 and the explanatory variable value extracted from the attribute forecast information 312 is input to the identified model by the correction value estimation module 309A2, so that the change coefficients α and β of the curve showing the temporal transition of the prediction target in the prediction target period are calculated.

Further, in identification of the model to be used for a calculation operation of the change coefficients α and β in the model identification module 309A1, as described using FIG. 6, the index value showing the timeliness calculated by the timeliness index value setting module 306 is used.

Further, in the first embodiment of the correction value calculation module 309 described above, the case where the model shown in the formula (1) is used as the model to be used for a calculation operation of the correction data has been described. However, the present invention is not limited thereto. For example, a form of a calculation formula and an explanatory variable to be used are arbitrary.

The explanatory variable may be a square value of the mean temperature and may be used as a design matrix including the variable. As a result, while the model is regarded as a linear expression, a nonlinear relation between the prediction target and the attributes can be expressed as the model. Specifically, similar to calculating a second sample value from a sample value, a third sample value is calculated from the second sample value.

Further, in the first embodiment of the correction value calculation module 309 described above, the case where the attributes to be used as the explanatory variables are uniquely set in advance has been described. However, the present invention is not limited thereto. For example, a method in which explanatory variables are automatically selected, such as ridge regression, lasso regression, or elastic net, may be adopted. A method of calculating a new component from explanatory variables of principal component regression or a partial least squares method may be adopted or a method using a nonlinear model of a neural network may be adopted.

In adopting any method, the index value showing the timeliness calculated by the timeliness index value setting module 306 may be used at the time of model identification. With the above, the same effect as that described using FIG. 11 can be obtained and explanatory variables according to the timeliness can be automatically selected. In other words, with the above, a change in the model used for a calculation operation of the correction data can be performed.

In the first embodiment of the correction value calculation module 309 described above, the case where which of a prediction value of a prediction target at an arbitrary time within the prediction target period, a prediction value of a maximum value or a minimum value in an arbitrary period within the prediction target period, and a prediction value of an integration value to be the correction data is used is preset has been described. However, the present invention is not limited thereto. For example, the prediction value to be used may be set automatically on the basis of the index value showing the reliability calculated by the reliability index value setting module 307.

Specifically, the index values of the reliabilities for the respective correction data may be compared and the correction data up to the preset ranking in descending order of reliabilities may be used by the following representative curve correction module 310. Further, after standardizing the index value showing the reliability of each correction data so that the index value showing the highest reliability becomes "1" and the index value showing the lowest reliability becomes "0", all of the correction data may be used by the following representative curve correction module 310.

In this case, the correction data whose index value is "0" is not used for curve correction as a result, so that automatic selection of the correction data is achieved. Further, correction may be performed to extremely increase a difference of the magnitude of the index value showing the reliability with a power of the index value of each correction data as a new index value. In this case, since the smallest index value is relatively equal to "0" for the largest index value, similar to the above case where the index value is "0", the smallest index value is not used practically for the curve correction as a result, so that automatic selection of the correction data is achieved.

(6-3) Second Embodiment of Representative Curve Correction Module

In the first embodiment of the representative curve correction module 310 described above, the case where only the change of the amplitude, the frequency, or both the amplitude and the frequency of the curve showing the temporal transition of the prediction target is set as the correction processing performed by the representative curve correction module 310 has been described. However, the present invention is not limited thereto. For example, when a seasonally peculiar or day-of-week peculiar error occurs steadily in a final prediction value calculated by changing the amplitude, the frequency, or both the amplitude and the frequency, this is a potential deviation remaining in a prediction system, so that processing for correcting the steady deviation may be added.

Figure 9:
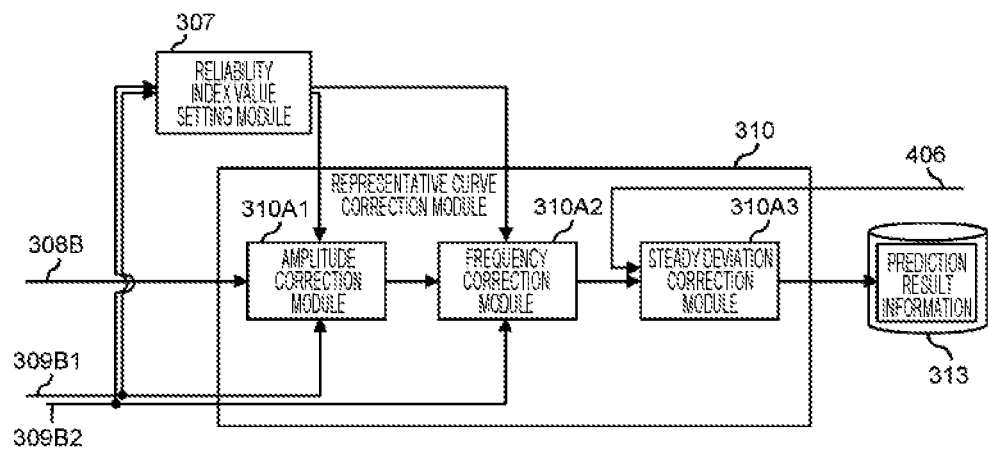
FIG. 9 is a block diagram showing a configuration of a prediction system according to a second embodiment of a representative curve correction module.

In FIG. 8, the corrected curve calculated by the amplitude correction module 310A1 and the frequency correction module 310A2 is output as the final prediction value. However, in the present embodiment, as shown in FIG. 9, a steady deviation correction module 310A3 corrects the steady deviation using the corrected curve and the demand result information 406 to be observed afterwards and stores it as the final prediction value in the prediction result information 313. As a result, the representative curve correction module 310 previously corrects the error that occurs steadily.

Figure 10:
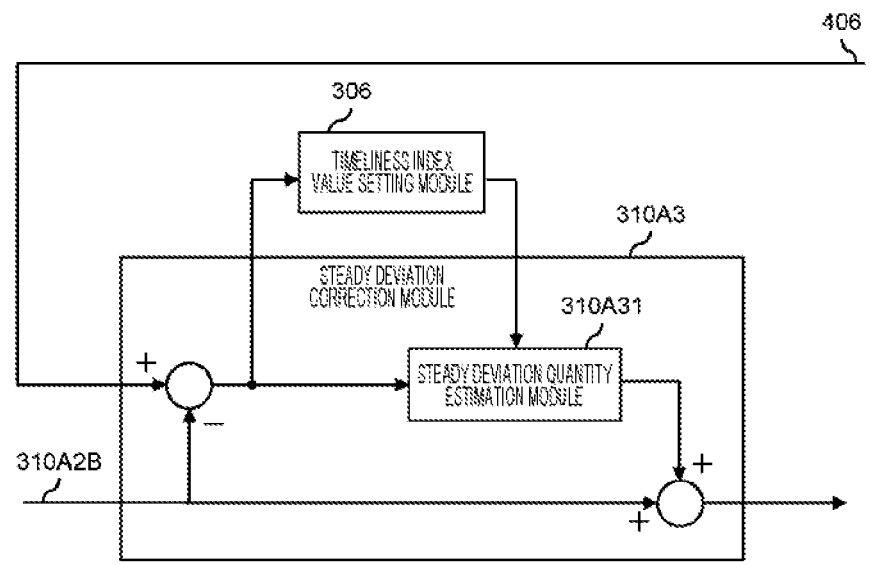
FIG. 10 is a block diagram showing a configuration of a prediction system according to a second embodiment of a representative curve correction module.

Specifically, as shown in FIG. 10, the representative curve correction module 310 further includes the steady deviation correction module 310A3. The steady deviation correction module 310A3 calculates a deviation to be a difference between a corrected curve 310A2B and the demand result information 406 to be observed afterwards. In addition, a steady deviation quantity estimation module 310A31 identifies a model that explains the residual and calculates an estimation value of the residual that can occur in the prediction target period, by the identified model. The calculated estimation value of the residual is added to the corrected curve 310A2B, so that the final prediction value is calculated.

Here, an algorithm used in the steady deviation quantity estimation module 310A31 may be, for example, the algorithm of the representative curve calculation module 308 described using FIG. 4. That is, the demand result information 406 to be input is replaced with the deviation to be the difference between the corrected curve 310A2B and the demand result information 406 to be observed afterwards.

By using the above algorithm, a curve of the residual that can occur in the prediction target period is calculated by the same processing as the time unit clustering processing module 308A1 and the time unit profiling processing module 308A2.

At this time, normalization processing for the residual to be input is omitted, so that a curve of the residual to be output becomes the estimation residual including information of the quantity. Alternatively, a curve of the residual that can occur in the prediction target period may be calculated using a time-series analysis method represented by an AR model or an ARIMA model. As described above, the steady deviation correction module 310A3 can correct a minute variation of the prediction target that cannot be completely explained in the prediction system.

Further, at the time of model identification in the steady deviation quantity estimation module 310A31, the index value showing the timeliness calculated by the timeliness index value setting module 306 may be used. However, in this case, an input to the timeliness index value setting module 306 is the above residual.

That is, by applying the index value showing the timeliness of each residual that has occurred in the past, a more plausible value can be calculated as the steady deviation that can occur in the prediction target period. In other words, the model to be used for the operation of the correction is appropriately changed according to the timeliness, so that final prediction accuracy can be improved.

(7) Other Embodiment

In the embodiments described above, the case where the index values showing the timeliness and the reliability are calculated by the timeliness index value setting module 306 and the reliability index value setting module 307, respectively, has been described. However, the present invention is not limited thereto. For example, for each of the index values of the timeliness and the reliability, a preset value may be directly used.

Further, in the embodiments described above, the case where a display is omitted to simplify the explanation has been described. However, the present invention is not limited thereto. For example, the calculation result of each processing module or the intermediate result of each processing module may be appropriately displayed through an output device such as a display or a printer.

Further, in the embodiments described above, the case where the demand of the power is predicted has been described. However, the present invention is not limited thereto and may be applied to the case where there is time-series data observed with a temporal transition. The time-series data observed with the temporal transition is, for example, a power generation amount of solar power generation or wind power generation, a contract price of a power product traded at a power exchange, a sales volume, or the like.

The present invention is not limited to a field of power and can be widely applied to fields where there is time-series data observed with the temporal transition, such as a communication amount of a base station in a communication business and a local traffic amount of vehicles or persons.

REFERENCE SIGNS LIST

1 supply and demand management system
2 electric utility system module
3 supply and demand manager system module 4 sales manager system module
5 transaction manager system module
6 facility manager system module
7 system operator system module
8 transaction market operator system module
9 public information provider system module
10 customer system module
30 prediction operation device
31 information input/output terminal
40 sales management device
50 transaction management device
60 facility management device
61 control device
70 system information management device
80 market operation management device
90 public information distribution device
111 network
112 network

The invention claimed is:

1. A system for calculating a prediction value related to a prediction target of future supply and demand of power to which prediction in an arbitrary period is adapted, the system comprising:
a storage device which records a plurality of data used to calculate the prediction value; and
a control device includes a predetermined operation model, applies the plurality of data to the operation model to calculate the prediction value, and changes the predetermined operation model using data determined based on respective temporal attributes of the plurality of data, wherein
the control device includes:
a representative curve calculation module which calculates a curve showing a temporal transition of the prediction value of the prediction target in the arbitrary period;
a correction value calculation module which calculates the prediction value on the basis of correction of the curve calculated by the representative curve calculation module; and
a model identification module which changes the predetermined operation model to at least one of:
a curve correction operation model for correcting the curve,
a curve calculation operation model for calculating the curve, and
a correction value calculation operation model for calculating a correction value of the curve, on the basis of:
the respective temporal attributes of the plurality of data, or
the respective variation ranges of the plurality of data; and
a facility management device that:
formulates an operation plan of a power generation facility based on the prediction value calculated by the operation model of the control device, and
transmits a control signal and the formulated operation plan to the control device, wherein
the control device subsequently calculates a control value of the power generation facility and executes control of the power generation facility; and executes the formulated operation plan.

2. The prediction system according to claim 1, wherein the correction value calculation module changes the curve showing the temporal transition of the prediction value of the prediction target, on the basis of at least one of an amplitude of the curve and a frequency of the curve.

3. The prediction system according to claim 1, wherein the model identification module constitutes the respective variation ranges of the plurality of data to include at least one of variation width of a quantitative variation width and a temporal variation width of a correction value to correct the curve showing a temporal transition of data showing a characteristic of the prediction target.

4. The prediction system according to claim 1, wherein the model identification module changes the curve correction operation model to be suitable for the correction value having a smallest variation range, using a variation range of each correction value.

5. The prediction system according to claim 1, wherein the control device uses the data determined on the basis of the temporal attributes for calculation of the curve or each correction value so as to show a temporal correlation with a prediction target period.

6. The prediction system according to claim 1, wherein the representative curve calculation module calculates new second data by performing at least one of selection of the data to calculate the curve and weighting of an influence degree of the data for calculation of the curve, on the basis of the temporal attributes, and
the model identification module changes the curve calculation operation model so that compatibility for the calculated second data becomes highest.

7. The prediction system according to claim 1, wherein the representative curve calculation module calculates new second data by performing at least one of selection of the data to calculate the curve and weighting of an influence degree of the data for calculation of the curve, on the basis of the temporal attributes, and
the model identification module changes the correction value calculation operation model so that compatibility for the calculated second data becomes highest.

8. The prediction system according to claim 1, wherein the representative curve calculation module calculates a variable value by inputting arbitrary partial variables or all variables among variables used in the correction value calculation operation model to an arbitrary linear or nonlinear function, calculates second data based on the variable value, and calculates new third data by performing at least one of selection of the second data to calculate the curve and weighting of an influence degree of the data for calculation of the curve, on the basis of the respective temporal attributes of the second data, and
the model identification module changes the curve calculation operation model so that compatibility for the calculated third data becomes highest.

9. The prediction system according to claim 1, wherein the model identification module changes the correction value calculation operation model by performing at least one of selection and weighting of the correction value calculation operation model in which the respective variation ranges of the plurality of data are small, on the basis of the respective variation ranges of the plurality of data.

10. The prediction system according to claim 1, wherein the correction value includes at least one of, at least one of a quantity and a time for at least one of a maximum value and a minimum value in each of arbitrary periods in a prediction target period and the respective variation ranges of the plurality of data.

11. The prediction system according to claim 1, wherein the correction value includes at least one of the prediction value of the prediction target at each of arbitrary times in a prediction target period and the respective variation ranges of the plurality of data.

12. The prediction system according to claim 1, wherein the correction value includes at least one of a coefficient value to correct the curve used in the correction value calculation module and the variation ranges.

13. A method for causing a control device to calculate a prediction value related to a prediction target of future supply and demand of power to which prediction in an arbitrary period is adapted, the method comprising:

reading, using the control device, a plurality of data used to calculate the prediction value from a storage device;

applying, using the control device, a predetermined operation model to the plurality of data to calculate the prediction value;

changing, using the control device, the predetermined operation model based on respective temporal attributes of the plurality of data;

changing, using the control device, the plurality of data to be applied to the new operation model based on respective variation ranges of the plurality of data;

calculating, using the control device, a curve showing a temporal transition of the prediction value of the prediction target in the arbitrary period, calculating, using the control device, the prediction value on the basis of correction of the calculated curve, wherein the predetermined operation model is changed to at least one of:

a curve correction operation model for correcting the curve, a curve calculation operation model for calculating the curve, or a correction value calculation operation model for calculating a correction value of the curve, on the basis of:

the respective temporal attributes of the plurality of data, or the respective variation ranges of the plurality of data, formulating, using a facility management device, an operation plan of a power generation facility based on the prediction value calculated by the operation model of the control device, transmitting, using the facility management device, a control signal and the formulated operation plan to the control device, calculating, using the control device, a control value of the power generation facility based on the formulated operation plan;

executing, using the control device, control of the power generation facility; and executing, using the facility management device, the formulated operation plan.

\* \* \* \* \*